US012539631B2

(12) United States Patent
Schipper et al.

(10) Patent No.: US 12,539,631 B2
(45) Date of Patent: Feb. 3, 2026

(54) HOUSING ASSEMBLY AND A METHOD OF MANUFACTURING

(71) Applicant: KONINKLIJKE PHILIPS N.V., Eindhoven (NL)

(72) Inventors: Niels Schipper, Groningen (NL); Karst Hendrik De Vries, Drachten (NL); Adarsh Shrivastava, Groningen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 138 days.

(21) Appl. No.: 18/689,587

(22) PCT Filed: Sep. 12, 2022

(86) PCT No.: PCT/EP2022/075269
§ 371 (c)(1),
(2) Date: Mar. 6, 2024

(87) PCT Pub. No.: WO2023/046511
PCT Pub. Date: Mar. 30, 2023

(65) Prior Publication Data

US 2025/0121516 A1 Apr. 17, 2025

(30) Foreign Application Priority Data

Sep. 23, 2021 (EP) .................................... 21198536

(51) Int. Cl.
*B26B 19/38* (2006.01)

(52) U.S. Cl.
CPC ...... *B26B 19/3886* (2013.01); *B26B 19/3866* (2013.01)

(58) Field of Classification Search
CPC ........................ B26B 19/3886; B26B 19/3866
See application file for complete search history.

(56) References Cited

U.S. PATENT DOCUMENTS 3,973,099 A 8/1976 Morris, Sr.
5,993,180 A * 11/1999 Westerhof ........... B26B 19/3873 417/571

(Continued)

FOREIGN PATENT DOCUMENTS

CN 207616631 U 7/2018
CN 108943567 A 12/2018

(Continued)

OTHER PUBLICATIONS

International Search report and Written Opinion of PCT/EP2022/075269, dated Dec. 23, 2022.

*Primary Examiner* — Omar Flores Sanchez

(57) ABSTRACT

According to a first aspect there is disclosed a housing assembly comprising: a housing body defining an interior space configured to receive a switch, and an aperture configured to provide access to the interior space from an exterior of the housing body; a soft sealing element disposed in the aperture and bonded to the housing body so as to seal the aperture between the interior space and the exterior of the housing body, the soft sealing element configured to be elastically deformable to actuate the switch when disposed in the housing body; and a hard island fixed to the soft sealing element, wherein the hard island is separate from, and moveable relative to, the housing body into the interior space so as to elastically deform the soft sealing element to actuate the switch when disposed in the housing body.

14 Claims, 6 Drawing Sheets

(56) References Cited

U.S. PATENT DOCUMENTS

| | | | | |
|---|---|---|---|---|
| 6,305,083 | B1 * | 10/2001 | Rijken | A61C 17/225 30/43.6 |
| 6,626,473 | B1 | 9/2003 | Klein et al. | |
| 10,253,530 | B2 * | 4/2019 | Savant | E05B 85/14 |
| 10,312,039 | B2 * | 6/2019 | Ely | H01H 9/54 |
| 2003/0080474 | A1 | 5/2003 | Boland et al. | |
| 2010/0325872 | A1 | 12/2010 | Schnak et al. | |
| 2016/0031099 | A1 | 2/2016 | Provolo et al. | |
| 2019/0175321 | A1 | 6/2019 | Kunz et al. | |
| 2021/0128286 | A1 | 5/2021 | Jungnickel et al. | |
| 2023/0373114 | A1 * | 11/2023 | Stegmann | B26B 19/3873 |
| 2025/0001629 | A1 * | 1/2025 | Masakawa | B26B 19/205 |

FOREIGN PATENT DOCUMENTS

| | | | |
|---|---|---|---|
| CN | 208759629 | U | 4/2019 |
| DE | 102008019822 | A1 | 10/2009 |
| EP | 1576865 | A2 | 9/2005 |
| WO | 0024565 | A1 | 5/2000 |
| WO | 2004057936 | A2 | 7/2004 |

* cited by examiner

HOUSING ASSEMBLY AND A METHOD OF MANUFACTURING

CROSS-REFERENCE TO PRIOR APPLICATIONS

This application is the U.S. National Phase application under 35 U.S.C. § 371 of International Application No. PCT/EP2022/075269 filed on Sep. 12, 2022, which claims the benefit of European Patent Application No. 21198536.1, filed on Sep. 23, 2021. These applications are hereby incorporated by reference herein.

FIELD OF THE INVENTION

The invention relates to a housing assembly and a personal care device comprising the housing assembly and a handle. The invention also relates to a method of manufacturing a housing assembly.

BACKGROUND OF THE INVENTION

Small electrical appliances, such as personal care devices, may be operated in an environment in which there is a risk of electrical damage or of an electrical hazard caused by an ingress of water or another type of liquid. For this reason, it is known to provide a small electrical appliance with a housing configured to prevent or to mitigate an ingress of liquid into an interior space of the housing.

The interior space of the housing may comprise, for example, a switch. Accordingly, it is desirable to provide electrical appliances with a housing which enables actuation of such a switch while continuing to prevent ingress of liquid into the interior space of the housing.

CA 2508836 discloses an electrical appliance housing with a housing body made from a rigid plastic, in which an opening is provided for the operation of a switch within the housing body. The opening is sealed by means of a membrane made from a flexible plastic and an operating knob for operating the switch is provided in or on the membrane. The operating knob is fixed to a rigid plastic socket which is materially connected to the membrane. The socket supporting the operating knob is connected to the housing body by means of an elastic bridge.

CN207616631 discloses a waterproof electric shaver button, including a body subassembly, the body subassembly includes a casing and installs the circuit board in the casing. It comprises a control switch on a circuit board, a separate trigger control switch button, and a sealing member, the button being installed in a keyhole in the casing, and the sealing member keeps apart the button and the circuit board.

U.S. Pat. No. 3,973,099 discloses a push button switch for setting the time display of electronic timepieces. This push button has a conductive elastomeric material as a conductive spring in its moving contact. The elastomer biased contact is seated in a port in the watch frame and bonded thereto to make the frame waterproof.

SUMMARY OF THE INVENTION

According to a first aspect there is disclosed a housing assembly comprising: a housing body defining an interior space configured to receive a switch, and an aperture configured to provide access to the interior space from an exterior of the housing body; a soft sealing element disposed in the aperture and bonded to the housing body so as to seal the aperture between the interior space and the exterior of the housing body, the soft sealing element configured to be elastically deformable to actuate the switch when disposed in the housing body; and a hard island fixed to the soft sealing element, wherein the hard island is separate from, and moveable relative to, the housing body into the interior space so as to elastically deform the soft sealing element to actuate the switch when disposed in the housing body.

The housing body defines a recessed overflow region extending from the aperture which receives the soft sealing element, the recessed overflow region comprising a main arm extending from the aperture and at least two diverging arms extending from the main arm with a rib separating the diverging arms.

The housing assembly may further comprise a user interface button coupled to the hard island on a side of the soft sealing element opposing the interior space. It may be that the user interface button is coupled to the hard island by means of an interference fit coupling or a snap fit coupling.

It may be that the hard island is supported by the soft sealing element such that the displacement of the hard island relative to the housing body is constrained by the soft sealing element alone. The hard island may not be in contact with the housing body. The hard island may be in contact only with the soft sealing element and the user interface button. The hard island may be bonded to the soft sealing element. The hard island may be bonded only to the soft sealing element.

The housing body of the housing assembly may comprise an aperture shelf surrounding an edge of the aperture, the aperture shelf being configured to provide a stop to the user interface button to limit movement of the user interface button towards the interior of the housing body.

It may be that a minimum distance between an edge of the hard island and an edge of the aperture is at least 1 mm. The hard island may have a maximum width of 5 mm, and/or a maximum height of 5 mm.

The housing body may further define a plurality of recessed legs extending from the aperture, and wherein the plurality of recessed legs may receive the soft sealing element. It may also be that the aperture is defined by a plurality of edges of the housing body, and that the plurality of recessed legs extends from the aperture at the edge or edges which have the smallest distance to the hard island. It may be that the housing body comprises a curved profile extending along an elongate axis, and wherein each of the plurality of recessed legs extends from the aperture in a direction perpendicular to the elongate axis. The recessed legs may extend from the aperture only in a direction perpendicular to the elongate axis.

It may be that the housing body and the hard island are formed of substantially the same material.

It may be that the hard island is fixed to a buckling region of the soft sealing element, and wherein the hard island is configured to elastically buckle the buckling region of the soft sealing element when pushed into the housing body.

The hard island may comprise a plurality of holes which receive the soft sealing element.

According to a second aspect, there is provided a personal care device comprising a handle and a housing assembly in accordance with the first aspect disposed within the handle. The handle may comprise a button aperture within which the user interface button is disposed.

According to a third aspect, there is provided a method of manufacturing a housing assembly, the method comprising:

injection moulding, in a first mould, a housing body defining an interior space configured to receive a switch, and comprising an aperture configured to provide access to the interior space from an exterior of the housing body, injection moulding, in the first mould, a hard island which is disposed in the aperture and separate from the housing body; and injection moulding, in the first mould, a soft plastic into the aperture and around the hard island to form a soft sealing element, such that the soft sealing element bonds to the housing body to seal the aperture and bonds with the hard island to fix the hard island to the soft sealing element on an opposing side of the soft sealing element to the interior of the housing body.

The hard island may be floating in the aperture during moulding. The housing body and the hard island may be simultaneously injection moulded. The housing body and the hard island may be injection moulded with the same material. The housing body and the hard island may be injection moulded together in a first shot of a two-shot injection moulding process, and the soft sealing element may be injection moulded in a second shot of the two-shot injection moulding process.

According to a fourth aspect, there is provided a method of manufacturing a personal care device, the method comprising manufacturing a housing assembly in accordance with the third aspect, and further comprising over-moulding, in a second mould, a handle around the housing body, the soft sealing element and the hard island.

The method according to the third or fourth aspect may further comprise coupling a user interface button to the hard island. Coupling the user interface button to the hard island may be by means of an interference fit or a snap fit.

It may be that the housing assembly manufactured in accordance with the third aspect and/or the fourth aspect is in accordance with the first aspect.

These and other aspects will be apparent from and elucidated with reference to the embodiments described hereinafter.

BRIEF DESCRIPTION OF THE DRAWINGS

Exemplary embodiments will now be described, by way of example only, with reference to the following drawings, in which.

DETAILED DESCRIPTION OF THE EMBODIMENTS

Figure 1:
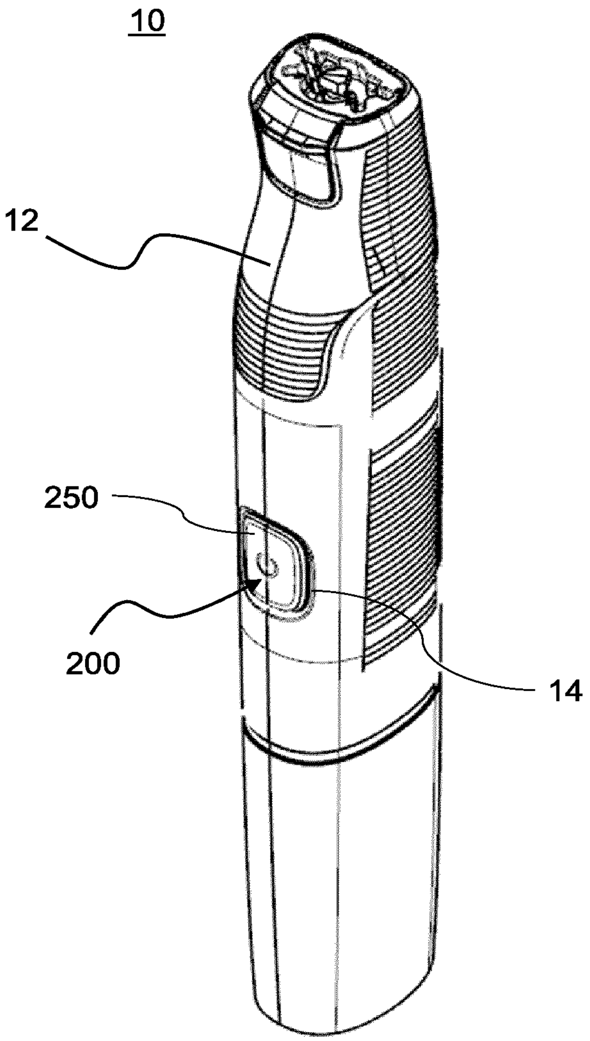
FIG. 1 schematically shows a perspective view of an example personal care device.

FIG. 1 shows an example personal care device 10 comprising a handle 12 and a user interface button 250 of a housing assembly 200 (best seen in FIGS. 2-4), which housing assembly 200 is disposed within the handle 12. In this example, the handle 12 is substantially cylindrical and comprises a button aperture 14 within which the user interface button 250 is disposed. The user interface button 250 is moveable with respect to the handle 12 towards an interior of the handle to actuate a switch 212 (shown in FIG. 4) disposed within the handle.

The personal care device 10 may be, for example, an oral health care device, a skin care device, a personal grooming device, a shaving device, a hair care device or the like. The housing assembly 200 will be described in further detail with reference to FIGS. 2 and 3.

Figure 2:
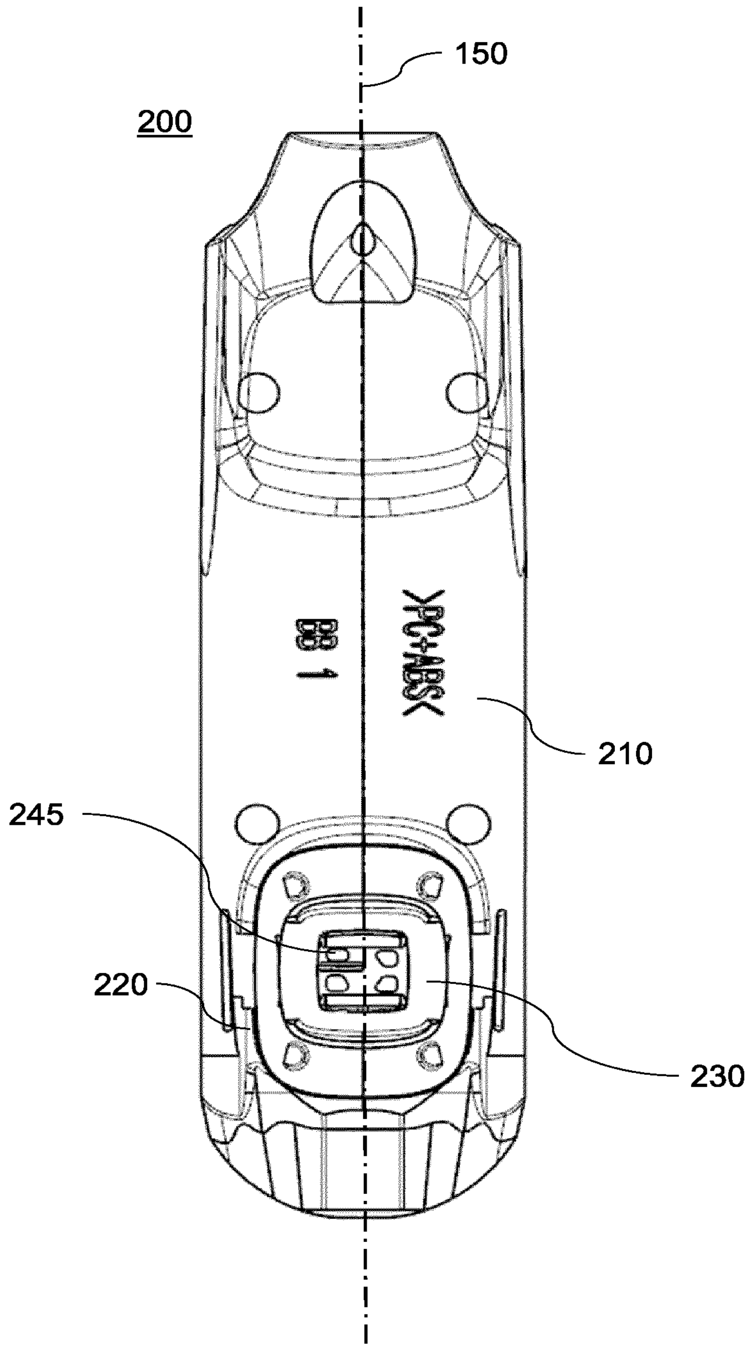
FIG. 2 schematically shows a front view of part of a housing assembly of the personal care device.
Figure 3:
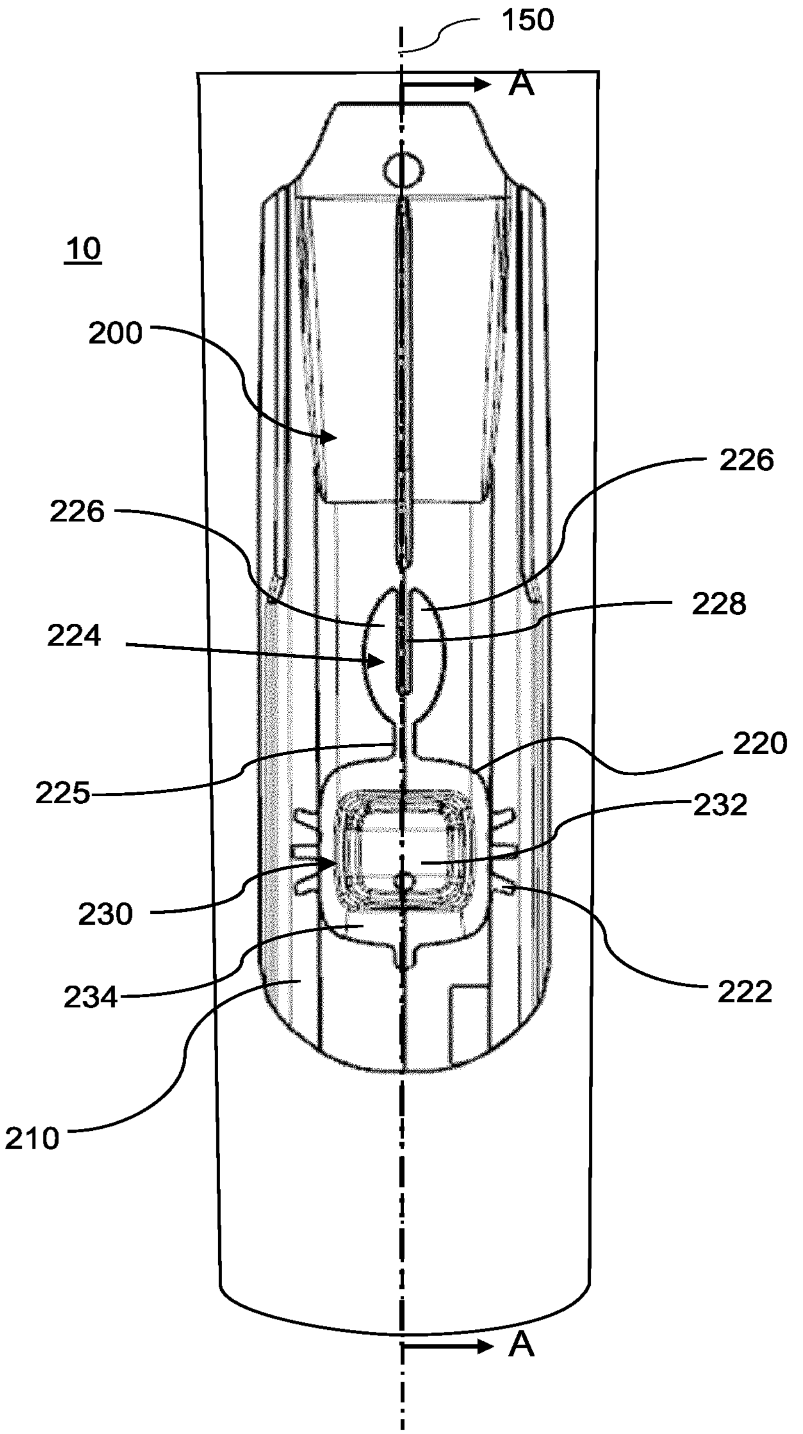
FIG. 3 schematically shows an interior view of a portion of the personal care device of FIG. 1.
Figure 4:
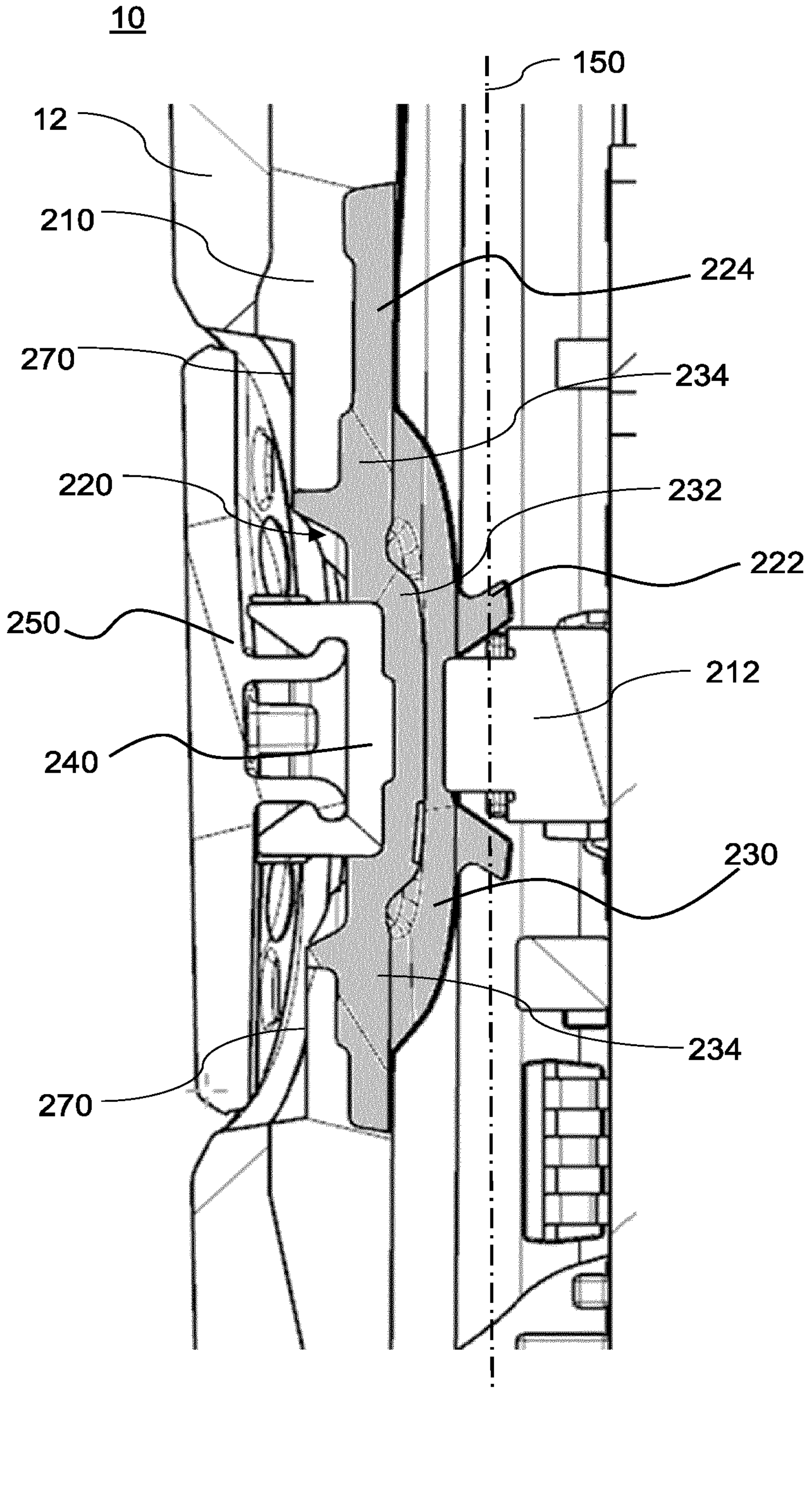
FIG. 4 schematically shows a cross-sectional view through line A-A of the example personal care device shown in FIG. 2.

FIG. 2 shows the housing assembly 200 without the user interface button 250, and FIGS. 3 and 4 show respectively an interior view and a cross-sectional view of the personal care device with the housing assembly 200 within the handle 12. The cross-sectional view of FIG. 4 is through cross-section A-A indicated on FIG. 3.

The housing assembly 200 comprises a housing body 210 which defines an interior space configured to receive electronic components. In this example, a switch 212 (shown in FIG. 4) is received in the interior space. The switch 212 is a mechanical switch, in this example. In other examples, the switch may be a non-contact type switch such as a capacitive-switch, an inductive-switch or a Hall effect-type switch. The switch 212 may be operatively associated with an electrical circuit. In some examples, the interior space of the housing body 210 is further configured to receive an electrical circuit operatively associated with the switch.

In this example, the housing body 210 comprises a curved profile extending along an elongate axis 150, such that it can fit into, and cooperate with, the substantially cylindrical handle 12. It will be appreciated that, in other examples, the housing body may have any suitable profile.

The housing body 210 further defines an aperture 220 configured to provide access to the interior space from an exterior of the housing body 210. In particular, the aperture 220 is configured to provide access to the switch 212 from exterior of the housing body 210.

The housing assembly 200 further comprises a soft sealing element 230 disposed in the aperture 220 and bonded to the housing body 210 so as to seal the aperture 220 between the interior space and the exterior of the housing body 210. The soft sealing element 230 is configured to be elastically deformable to actuate the switch 212. In this example, the soft sealing element 230 comprises an actuating region 232 and bonding regions 234 surrounding the actuating region 232. The actuating region 232 has a plane which is offset into the interior of the housing body 210. Elastic deformation of the soft sealing element 230 into the interior of the housing body 210 causes the actuating region 232 of the soft sealing element 230 to enter into contact with the switch 212 to thereby actuate the switch 212. In other examples, the soft sealing element may only allow enough elastic deformation to cause the actuating region of the soft sealing element to enter into proximity of a non-contact switch, to actuate the non-contact switch.

The housing assembly 200 further comprises a hard island 240 which is bonded to the soft sealing element 230 such that it is fixed to the soft sealing element 230. In this example, the hard island 240 is directly fixed to the actuating region 232 of the soft sealing element 230. In some examples, the hard island may be fixed to the soft sealing element 230 by any suitable fixing means.

In this example, the hard island 240 comprises a plurality of holes 245 which receive the soft sealing element 230, so as to provide a larger interfacial surface area between the hard island 240 and the soft sealing element 230, thereby improving the strength of bonding between the hard island

240 and the soft sealing element 230. In other examples, the hard island may not comprise such holes, and may be otherwise profiled to bond or embed in the soft sealing element.

The hard island 240 is separate from, and moveable relative to, the housing body 210 into the interior space so as to elastically deform the soft sealing element 230. The hard island 240 is therefore disconnected from (i.e., not in contact with) the housing body 210 so that it is moveable independently of the housing body 210.

In this example, the housing assembly 200 further comprises the user interface button 250 (shown in FIG. 4) which is coupled to the hard island 240 on a side of the soft sealing element 230 opposing the interior space. Therefore, in this example, the hard island 240 is in contact with both the soft sealing element 230 and the user interface button 250.

In use, the hard island 240 may be moved relative to the housing body 210 by an actuating force applied by, for example, a finger or a thumb of a user on the user interface button 250. A displacement of the hard island 240 into the interior space elastically deforms the soft sealing element 230 and may thereby cause an actuation of the switch 212. In this example, the displacement of the hard island 240, and therefore the soft sealing element 230 into the interior of the housing body 210 is limited by an aperture shelf 270 surrounding an edge of the aperture 220. The aperture shelf 270 provides a stop to the user interface button 250 to limit movement of the user interface button 250 towards the interior of the housing body 210, thus protecting the soft sealing element 230 and the switch 212 from excessive forces being applied thereto.

The hard island 240 has a substantially square cross-sectional profile with a width of approximately 4 mm and a height of approximately 4 mm. In other examples, the hard island may have any suitable dimensions, and in some examples, the height or width of the hard island 240 may be no larger than 5 mm.

Having the hard island 240 being no larger than 5 mm in height and width reduces the force required to displace the hard island 240 sufficiently to actuate the switch 212, since the amount of the soft sealing element 230 which must be displaced with the hard island 240 is also reduced, compared with, for example, a larger hard island or simply a user's finger or thumb deforming the soft sealing element 230.

The hard island 240 is disposed in the centre of the aperture 220, with a distance between the edges of the hard island 240 and the respective nearest edges of the aperture 220 being approximately 2 mm. In other examples, the distance between the respective nearest edges may be any suitable distance, or may be at least 1 mm. Having a distance of at least 1 mm between the edge of the aperture and the edge of the hard island further reduces the forces required to displace the hard island sufficiently to actuate the switch, since the ratio of extension of the part of the soft sealing element between the edges, and the un-extended length of that part of the soft sealing element is lower.

In use, an application of an actuating force results in the soft sealing element 230 providing an opposing reactive force, and therefore causes a reactive stress to develop in an interfacial region between the soft sealing element 230 and the housing body 210 as well as in an interfacial region between the hard island 240 and the soft sealing element 230. Therefore, reducing the force required to actuate the switch 212 also reduces the reactive stresses experienced at the bonded interfaces between the soft sealing element 230 and the housing body 210. A reduced magnitude of the reactive stress developed in the interfacial region between the soft sealing element 230 and the housing body 210 also improves the durability of the bonding therebetween.

The user interface button 250 in this example provides a more ergonomic interface for a user to actuate the switch 212 when disposed within the housing body 210 than the hard island 240 would otherwise provide. In particular, a geometry of the hard island 240 may be chosen to reduce the reactive stresses developed within an interfacial region between the soft sealing element 230 and the housing body 210. On the other hand, a geometry of the user interface button 250 may be chosen based on purely ergonomic considerations. Further, having a separate user interface button 250 and hard island 240 means that the user interface button 250 may be formed of a material which is different to the material of which the hard island 240 is formed. This enables the material of which the hard island 240 is formed and the material of which the user interface button 250 is formed to be chosen according to different material selection criteria. For example, the material for the hard island 240 may be selected based on its bonding qualities with the soft sealing element material, whereas the user interface button may be selected for hard-wearing qualities, to maximise design life. It will be appreciated that in other examples, there may be no user interface button, and a user may apply force directly to the hard island to actuate the switch.

In this example, the user interface button 250 is coupled to the hard island 240 by means of a snap fit coupling. In other examples, the user interface button may be coupled to the hard island with an interference fit, or with any other suitable fixing means, such as screws or an adhesive. Use of an interference fit coupling or a snap fit coupling enables the user interface button 250 to be easily removed and/or replaced during a lifetime of the housing assembly, and do not present the same material limitations as, for example, adhesives.

The hard island 240 is formed of a material having a modulus of elasticity which is greater than a modulus of elasticity of a material of which the soft sealing element 230 is formed. In this example, the modulus of elasticity of the hard island 240 is high enough such that the hard island 240 does not significantly deform in response to a force being applied which is equal to the force required to actuate the switch 212, and the modulus of elasticity of the soft sealing element is low enough that an average user can manually deform the soft sealing element 230 enough to actuate the switch 212. In this example, each of the housing body 210, soft sealing element 230 and the hard island 240 comprise a material suitable for use in an injection moulding process. In this example, the housing body 210 and the hard island 240 are comprised of substantially the same material for ease of manufacturing. In other examples, the housing body material may not be the same as the hard island material.

The hard island 240 is fixed to and supported by the soft sealing element 230 such that the displacement of the hard island 240 into the interior space is constrained by the elastic deformation of the soft sealing element 230 only. In other words, the displacement of the hard island 240 into the interior space is not constrained by anything other than the soft sealing element 230. Accordingly, the displacement of the hard island 240 into the interior space is not constrained to follow a predetermined trajectory, such as an arcuate or a radial trajectory. The hard island 240 therefore permits more precise actuation of the switch 212.

If the hard island 240 were not provided to the housing assembly 200, an actuating force directly applied to the soft sealing element 230 by, for example, a finger or a thumb of a user may cause a magnitude of an elastic deformation of the soft sealing element 230 at a location near the edge of the aperture 220 to be relatively large. Accordingly, the provision of the hard island 240 to the soft sealing element 230 ensures a precise and a consistent application of an actuating force by a user, which in turn reduces the likelihood of a large reactive stress being developed in the interfacial region between the soft sealing element 230 and the housing body 210. The provision of the hard island 240 to the soft sealing element 230 therefore improves durability of the bonding between the soft sealing element 230 and the housing body 210.

The housing body 210 also defines a recessed overflow region 224 which receives the soft sealing element 230 and which extends from the aperture 220. In other words, the overflow region 224 is defined by a recess in an inner surface of the housing body 210 (shown in FIG. 1). The overflow region 224 comprises a main arm 225 which extends directly from the aperture 220 and at least two diverging arms 226 extending from the main arm 225, separated by a rib 228. The rib 228 provides additional strength to the overflow region 224, which allows the housing body 210 to be more effectively attached to or incorporated into another component by means of, for example, an over-moulding process.

The overflow region 224 provides a pathway for an air pocket to migrate away from critical parts of the interfacial region between the soft sealing element 230 and the housing body 210 surrounding the hard island 240 during an injection moulding process. Accordingly, the overflow region 224 may provide an improved quality of the bonding between the soft sealing element 230 and the housing body 210 in critical parts of the interfacial region between the soft sealing element 230 and the housing body 210.

The strength of the bonding between the soft sealing element 230 and the housing body 210 is related to a quality of the bonding therebetween, which is dependent on, among other things, a presence of air pockets in critical parts of the interfacial region between the soft sealing element 230 and the housing body 210. Critical parts of the interfacial region between the soft sealing element 230 and the housing body 210 may correspond to parts of the interfacial region proximal to the hard island 240, and which are therefore subject to a greater reactive stress during an application of an actuating force. Therefore, the removal of air pockets from critical parts of the soft sealing element surrounding the hard island 240 in the aperture 220, by providing the overflow region 224 improves the strength of the bonding between the soft sealing element 230 and the housing body 210. Further, providing a recessed overflow region 224 rather than an overflow region which extends through the thickness of the housing body also improves a strength of the housing body 210.

The housing body 210 also defines a plurality of recessed legs 222 configured to receive the soft sealing element 230 and extending from the aperture 220, as shown in FIG. 2. In other words, the legs 222 are each defined by a recess in an inner surface of the housing body 210. The plurality of legs 222 provide an extended interfacial area between the soft sealing element 230 and the housing body 210 thereby improving strength of the bonding between the soft sealing element 230 and the housing body 210, which in turn improves durability of the housing assembly 200.

Having the plurality of recessed legs 222 which do not fully extend through a through a thickness of the housing body 210 provides a further enlarged interfacial region between the soft sealing element 230 and the housing body 210, thus further improving the bonding strength between the soft sealing element 230 and the housing body 210.

Furthermore, recessing the legs 222 rather than extending through the thickness of the housing body also improves the strength of the housing body 210.

Each of the plurality of recessed legs 222 extends from the aperture 220 in a direction which is substantially perpendicular to the elongate axis 150 along which the curved surface of the housing body 210 extends. This provides improved bonding in a most vulnerable direction (i.e. within the plane perpendicular to the elongate axis 150), since the curvature of the housing body 210 in the plane perpendicular to the elongate axis 150 introduces space constraints in the direction perpendicular to the elongate axis 150, the distance between the aperture 220 and the hard island 240 is smallest in that direction, which increases the reactive stresses in a direction perpendicular to the elongate axis 150, which reduces the bonding performance in that direction. In some examples, the plurality of recessed legs may extend from the aperture only in a direction substantially perpendicular to the elongate axis, which would be the most efficient use of soft sealing element material, by targeting only the most vulnerable areas for improved bonding.

In some examples, the soft sealing element may comprise a buckling region surrounding the actuation region. The buckling region may comprise an S-shaped profile which snaps the actuation region between a projected position and an actuated position, to provide a better ergonomic feel to pressing the user interface button. In such examples, during the application of an actuating force to the hard island, the buckling region of the soft sealing element is configured to buckle to snap the actuation region to the actuated position, as it is pushed into the housing body. The elastic buckling of the buckling region stores energy in a buckled structure thereof and thereby reduces a reactive force in the soft sealing element during an application of an actuating force. Therefore, a reactive stress developed in the interfacial region between the soft sealing element and the housing body is reduced, which improves durability of the housing assembly.

Figure 5:
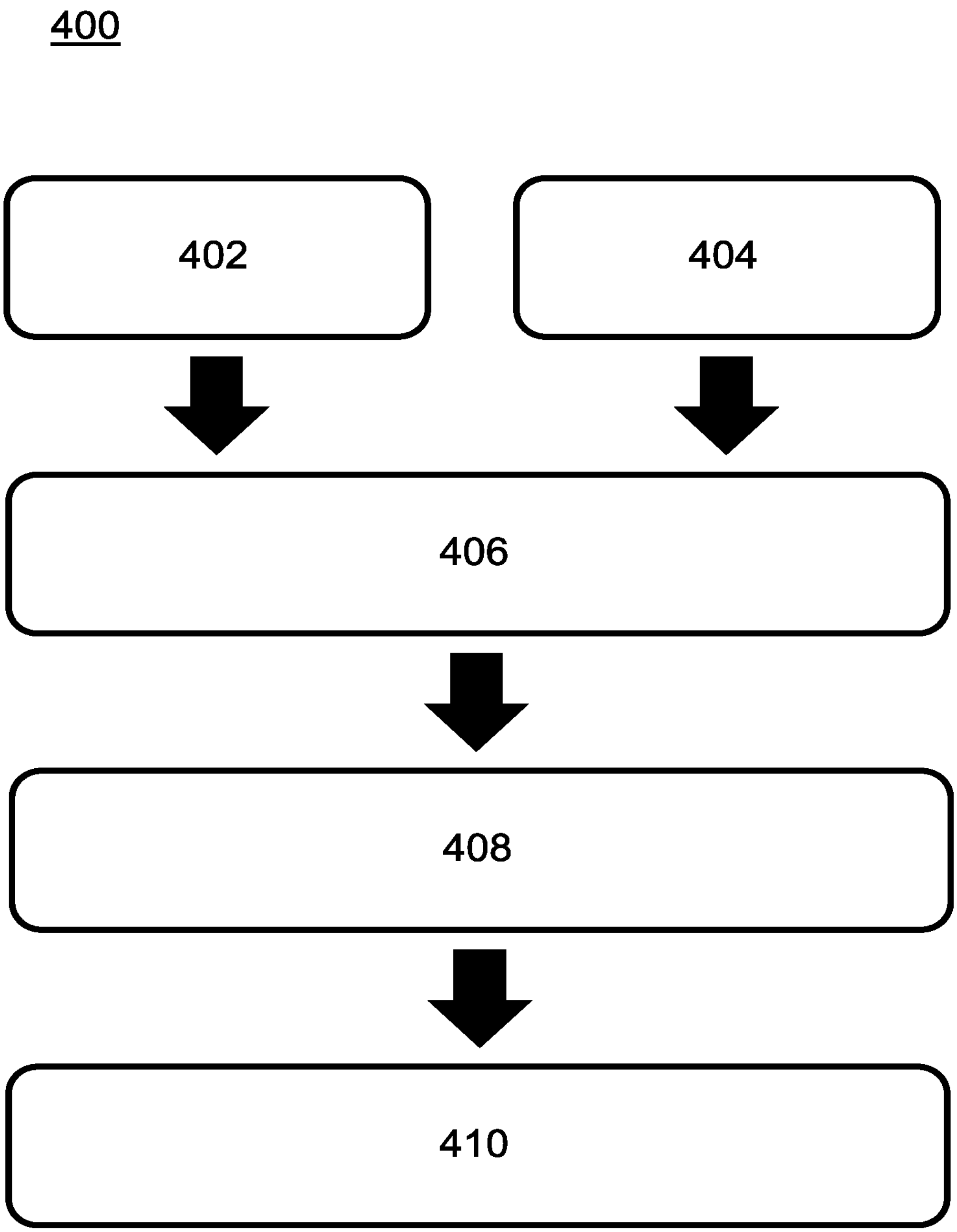
FIG. 5 is a flowchart which shows a method of manufacturing an example housing assembly.

FIG. 5 is a flowchart showing a method 400 of manufacturing a housing assembly 500, such as the housing assembly 200 described with reference to FIGS. 2-4. FIGS. 6A-6D show perspective views of components of the housing assembly 500 produced as a result of corresponding steps of the method 400.

Figure 6A:
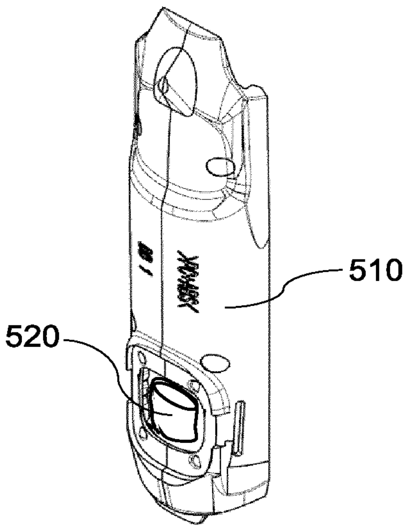
FIGS. 6A-6D schematically show perspective views of the example housing assembly produced as a result of corresponding steps of the method shown in FIG. 4.

The method 400 begins at block 402, the result of which is shown in FIG. 6A. Block 402 comprises injection moulding, in a first mould, a housing body 510 defining an interior space configured to receive a switch and comprising an aperture 520 configured to provide access to the interior space from an exterior of the housing body 510.

Figure 6B:
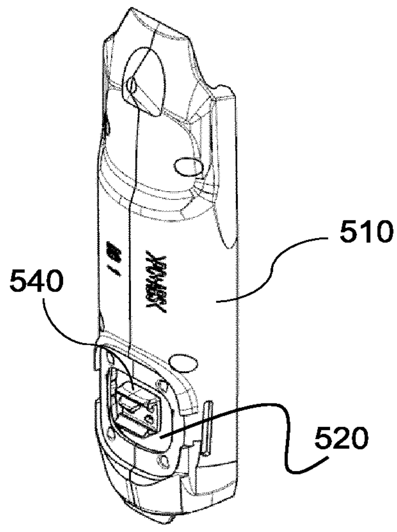

The method 400 also comprises block 404, the result of which is shown in FIG. 6B. Block 404 includes injection moulding, in the first mould, a hard island 540 which is disposed in the aperture 520 and separate from the housing body 510. The hard island 540 is therefore floating in the aperture 520 during moulding.

In this example, blocks 402 and step 404 are executed simultaneously with substantially the same material, to produce the components shown in FIG. 6B. Executing blocks 402 and 404 simultaneously means that both can be injection moulded in a first shot of a two-shot injection moulding process. This improves efficiency of the moulding of the housing assembly. In other examples, blocks 402 and 404 may not occur simultaneously, but rather sequentially and in any order.

Figure 6C:
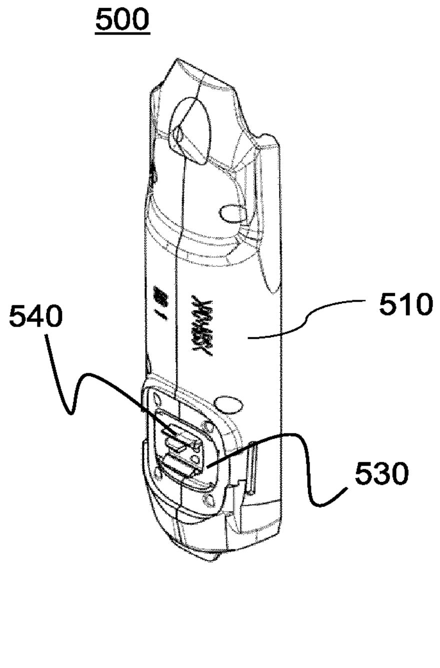

The method 400 then proceeds to block 406, the result of which is shown in FIG. 6C. Block 406 comprises injection moulding, in the first mould, a soft plastic into the aperture 520 and around the hard island 540 to form a soft sealing element 530, such that the soft sealing element 530 bonds to the housing body 510 to seal the aperture 520 and bonds with the hard island 540 to fix the hard island 540 to the soft sealing element 530 on an opposing side of the soft sealing element 530 to the interior of the housing body 510. Block 406 is therefore the second shot in the two-shot injection moulding process. It will be appreciated that, in other examples, each of blocks 402 to 406 could be carried out in a different mould and need not be performed as part of a two-shot injection moulding process. The result of block 406 is a substantially water-tight housing assembly 500 for a switch, comprising a soft sealing element 530 which is deformable to actuate a switch within the housing body 510, and a hard island 540 for pressing by a user to move the soft sealing element 530 to actuate the switch.

Figure 6D:
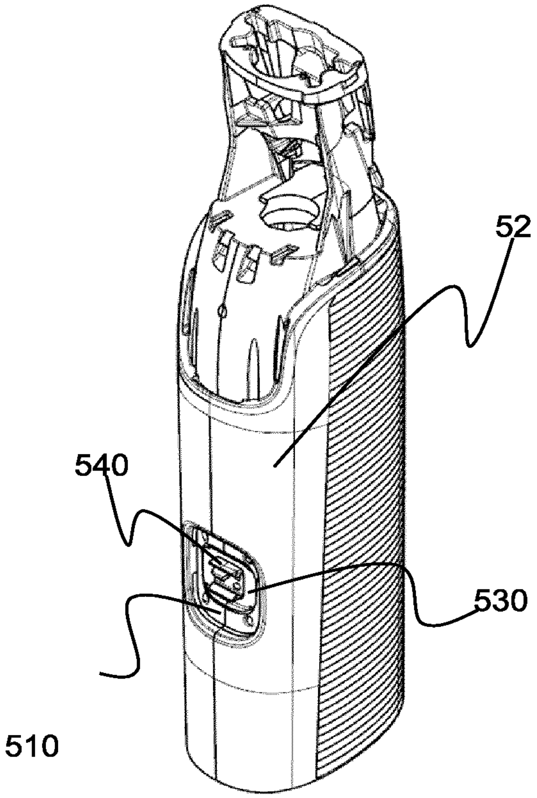

In this example, the method 400 further comprises block 408, the result of which is shown in FIG. 6D. Block 408 includes over-moulding, in a second mould, a handle 52 around the housing body 510, the soft sealing element 530 and the hard island 540. The handle 52 may be in accordance with the handle 12 described with reference to FIG. 1. The handle 52 may provide a more ergonomic handhold for a user. In some examples, the method may not include block 408.

In this example, the method 400 further includes block 410. Block 410 comprises coupling a user interface button to the hard island 540 to produce a personal care device, such as the personal care device 10 described with reference to FIGS. 1-4. In this example, block 410 is performed after block 408. In other examples in which block 408 is not executed, block 410 may be executed directly after block 406. In yet further examples, block 410 may not be executed at all.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. Any reference signs in the claims should not be construed as limiting the scope.

The invention claimed is:

1. A housing assembly comprising:

a housing body defining an interior space configured to receive a switch, and an aperture configured to provide access to the interior space from an exterior of the housing body;

a soft sealing element disposed in the aperture and bonded to the housing body so as to seal the aperture between the interior space and the exterior of the housing body, the soft sealing element configured to be elastically deformable to actuate the switch when disposed in the housing body; and a hard island fixed to the soft sealing element, wherein the hard island is separate from, and moveable relative to, the housing body into the interior space so as to elastically deform the soft sealing element to actuate the switch when disposed in the housing body wherein the housing body further defines a recessed overflow region extending from the aperture which receives the soft sealing element, the recessed overflow region comprising a main arm extending from the aperture and at least two diverging arms extending from the main arm with a rib separating the diverging arms.

2. A housing assembly according to claim 1, further comprising a user interface button coupled to the hard island on a side of the soft sealing element opposing the interior space.

3. A housing assembly according to claim 2, wherein the housing body of the housing assembly comprises an aperture shelf surrounding an edge of the aperture, the aperture shelf being configured to provide a stop to the user interface button to limit movement of the user interface button towards the interior of the housing body.

4. A housing assembly according to claim 1, wherein a minimum distance between an edge of the hard island and an edge of the aperture is at least 1 mm.

5. A housing assembly accordingly to claim 1, wherein the housing body further defines a plurality of recessed legs extending from the aperture, and wherein the plurality of recessed legs receive the soft sealing element.

6. A housing assembly according to claim 5, wherein the housing body comprises a curved profile extending along an elongate axis, and wherein each of the plurality of recessed legs extends from the aperture in a direction perpendicular to the elongate axis.

7. A housing assembly according to claim 1, wherein the housing body and the hard island are formed of substantially the same material.

8. A housing assembly according to claim 1, wherein the user interface button is coupled to the hard island by means of an interference fit coupling or a snap fit coupling.

9. A housing assembly according to claim 1, wherein the hard island comprises a plurality of holes which receive the soft sealing element.

10. A personal care device comprising a handle and a housing assembly in accordance with any preceding claim disposed within the handle.

11. A personal care device according to claim 10 wherein the handle comprises a button aperture within which the user interface button is disposed.

12. A method of manufacturing a housing assembly, the method comprising:

injection moulding, in a first mould, a housing body defining an interior space configured to receive a switch, and comprising an aperture configured to provide access to the interior space from an exterior of the housing body, wherein the housing body further defines a recessed overflow region extending from the aperture which receives the soft sealing element, the recessed overflow region comprising a main arm extending from the aperture and at least two diverging arms extending from the main arm with a rib separating the diverging arms, injection moulding, in the first mould, a hard island which is disposed in the aperture and separate from the housing body; and injection moulding, in the first mould, a soft plastic into the aperture and around the hard island to form a soft sealing element, such that the soft sealing element bonds to the housing body to seal the aperture and bonds with the hard island to fix the hard island to the soft sealing element on an opposing side of the soft sealing element to the interior of the housing body.

13. A method of manufacturing a personal care device, the method comprising manufacturing a housing assembly according to claim 12, and further comprising over-moulding, in a second mould, a handle around the housing body, the soft sealing element and the hard island.

14. A method of manufacturing a personal care device, wherein the housing assembly is in accordance with claim 1.

* * * * *